United States Patent
Chen

(10) Patent No.: US 8,711,934 B2
(45) Date of Patent: *Apr. 29, 2014

(54) DECODING AND PRESENTATION TIME STAMPS FOR MPEG-4 ADVANCED VIDEO CODING

(71) Applicant: Broadcom Corporation, Irvine, CA (US)

(72) Inventor: Sherman (Xuemin) Chen, Rancho Santa Fe, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/776,023

(22) Filed: Feb. 25, 2013

(65) Prior Publication Data

US 2013/0188743 A1 Jul. 25, 2013

Related U.S. Application Data

(63) Continuation of application No. 12/830,605, filed on Jul. 9, 2010, now Pat. No. 8,385,413, which is a continuation of application No. 10/340,061, filed on Jan. 9, 2003, now Pat. No. 7,787,539.

(60) Provisional application No. 60/396,510, filed on Jul. 17, 2002.

(51) Int. Cl.
- *H04N 7/12* (2006.01)
- *H04N 11/02* (2006.01)
- *H04N 11/04* (2006.01)

(52) U.S. Cl.
USPC .............................. 375/240.12; 375/240.25

(58) Field of Classification Search
USPC ........................................ 375/240.12, 240.15
See application file for complete search history.

(56) References Cited

U.S. PATENT DOCUMENTS

| | | | |
|---|---|---|---|
| 5,481,543 A | 1/1996 | Veltman | |
| 6,320,909 B1 * | 11/2001 | Takabatake et al. | 375/240.25 |
| 6,741,290 B1 | 5/2004 | Wells | |
| 6,806,909 B1 * | 10/2004 | Radha et al. | 348/384.1 |
| 6,816,552 B2 | 11/2004 | Demos | |
| 6,882,687 B2 | 4/2005 | Yamamoto | |

* cited by examiner

*Primary Examiner* — Jorge L Ortiz Criado
*Assistant Examiner* — Jeremaiah C Hallenbeck-Huber
(74) *Attorney, Agent, or Firm* — Foley & Lardner LLP

(57) ABSTRACT

A system, method, and apparatus for time stamping compressed video data is disclosed. A delay parameter is generated and can be encoded with the compressed video, representing the number of picture delay between the decoded sequence and the presented sequence. The presentation time stamp is associated with each of the pictures. The presentation time stamp is a function of the delay parameter and other parameters associated with picture associated therewith.

20 Claims, 12 Drawing Sheets

DECODING AND PRESENTATION TIME STAMPS FOR MPEG-4 ADVANCED VIDEO CODING

RELATED APPLICATIONS

This application is a continuation of U.S. patent application Ser. No. 12/830,605 entitled "DECODING AND PRESENTATION TIME STAMPS FOR MPEG-4 ADVANCED VIDEO CODING" and filed Jul. 6, 2010, which is hereby incorporated by reference in its entirety, and which is a continuation of U.S. Pat. No. 7,787,539 entitled "DECODING AND PRESENTATION TIME STAMPS FOR MPEG-4 ADVANCED VIDEO CODING" having Ser. No. 10/340,061, filed Jan. 9, 2003, which makes reference to, claims priority to and claims the benefit of Provisional Application for United States Patent, Ser. No. 60/396,510, filed Jul. 17, 2002, entitled "Decoding and Presentation Time Stamps for MPEG-4 Advanced Video Coding", by Chen, which is incorporated herein by reference.

BACKGROUND OF THE INVENTION

Decoding and presentation time stamping systems play a very important role in providing proper synchronization (e.g., audio and video synchronization) for the operation of the decoding process. In a video transport system, the system clock of a video program is usually used to create timestamps that indicate the presentation and decoding timing values of the system clock itself at sampled intervals. It is the presence of these time stamps and the correct use of the timestamps that provide the facility to synchronize properly the operation of the decoding.

The MPEG-2 Systems standard is detailed in ITU-T Recommendation H.222.0 (1995)|ISO/IEC 13818-1: 1996, *Information Technology—Generic Coding of Moving Pictures and Associated Audio Information Systems* which is hereby incorporated by reference for all purposes. In MPEG-2 systems, a video elementary stream is assembled into a packetized elementary stream (PES). Presentation Time Stamps (PTS) are carried in headers of the packetized elementary stream. Decoding time stamps (DTS) are also carried in PES headers of an I- or P-picture when bi-directional predictive coding is enabled. The DTS field is not sent with a video PES stream that was generated with B-picture decoding disabled. The value for a component of PTS (and DTS, if present) is derived from the 90 KHz portion of the program clock reference that is assigned to the service to which the component belongs.

Both PTS and DTS are determined in the video encoder for coded video pictures. If a stream includes only I and P-pictures, these pictures need not be delayed in the reorder buffer and the PTS and DTS are identical. This is known as the low delay mode, and is indicated in the MPEG-2 video elementary stream. If B-pictures are included in the video stream, coded pictures do not arrive at the decoder in presentation order. Some pictures in the stream must be stored in a reorder buffer in the decoder after being decoded until their corrected presentation time.

FIG. 1A is a timing diagram for decoding and presenting an exemplary video sequence. The pictures $B_1$, $B_2$, and $B_3$ are decoded from $I_0$ and $P_4$. Accordingly, $P_4$ is decoded prior to $B_1$, $B_2$, and $B_3$. However, after decoding, $P_4$ is stored in a reorder buffer until after $B_1$, $B_2$, and $B_3$ are presented for display. Any I- or P-picture previously stored in the reorder buffer is presented before the next I- or P-picture. While the I- or P-picture is stored in the reorder buffer, any subsequent B-picture(s) are decoded and presented. This is known as non low-delay mode.

For MPEG-2 video, DTS indicates the time when the associated video picture is to be decoded while PTS indicates the time when the presentation unit decoded from the associated video picture is to be presented on the display. Times indicated by PTS and DTS are evaluated with respect to the current System Time Clock value—locked to Program Clock Reference (PCR). For B-pictures, PTS is equal to DTS. For I and P-pictures, PTS and DTS differ by the time that the pictures is delayed in the reorder buffer, which is a multiple of the nominal picture period.

The DTS for a given picture is calculated by adding a fixed delay time, D*f (where f is equal to the time for displaying one frame and D is an integer), to the Picture Sync Time Stamp (PSTS). The picture sync time stamp is a 33-bit value of the 90 Khz portion of the PCR that is latched by the picture sync. The delay time, D*f, is nominally the delay from the input of the MPEG-2 video encoder to the output of the MPEG-2 video decoder. This delay is also known as end-to-end delay and is most likely determined during system integration testing.

The position of a picture in the final display order is determined by using the picture type (I, P, or B). The number of pictures, if any, for which the current picture is delayed before presentation is used to calculate the PTS from the DTS. If the picture is a B-picture, the PTS and DTS are identical, because B-pictures are not used as reference pictures in the MPEG-2 standard.

Another variant of the MPEG specification is known as MPEG-4 Advanced Video Coding (MPEG-4 AVC) and is described in Committee Draft, JVT-C167, ITU-T Recommendation H.264, which is incorporated herein by reference. One of the differences between the MPEG-4 AVC standard and the MPEG-2 standard is that MPEG-4 B-pictures can be used as reference pictures. Another difference is that P-pictures can be predicted from later reference pictures. Consequently, the low-delay/non-low delay method for determining the presentation time stamps is insufficient.

Accordingly, it would be advantageous if a time-stamping scheme for MPEG-4 AVC is provided. Further limitations and disadvantages of conventional and traditional approaches will become apparent to one of skill in the art, through comparison of such systems with embodiments presented in the remainder of the present application with references to the drawings.

BRIEF SUMMARY OF THE INVENTION

A system, method, and apparatus are presented herein for time stamping a packetized MPEG-4 AVC video elementary stream with decoding time stamps and presentation time stamps. The decoding time stamps for each picture in the packetized video elementary stream is determined by addition of a fixed delay to the time the picture is received at an encoder buffer. The fixed delay represents the time period for transmission from receipt at the encoder to the time of decoding. The PTS is calculated by adding an offset to the DTS. The offset is a function of the picture type, and parameters of the encoder. The parameters include a sequence parameter indicating the number of picture delays between the decoded sequence and the presented sequence, and the number of pictures, m, which the encoder inserts between anchor pictures (I-pictures and P-pictures).

A video encoder is presented which generates a sequence delay parameter. The sequence delay parameter indicates the number of picture delays between the decoded sequence and the presented sequence. The sequence delay parameter can be coded into headers (e.g. sequence parameter set) of the video elementary stream. The sequence delay parameter can be encoded using a variable length code. Decoding time stamps and presentation time stamps are placed into the packetized video elementary stream. A PTS/DTS coder calculates the DTS and PTS and places the DTS and PTS into the packetized video elementary stream. The PTS is calculated as a function of the delay parameter.

DETAILED DESCRIPTION OF THE INVENTION

Although the foregoing embodiments are described in the context of the MPEG-4 AVC standard, it should be noted that the present invention is not limited to the MPEG-4 AVC standard and is applicable in other contexts where pictures are predicted from other pictures.

Figure 1A:
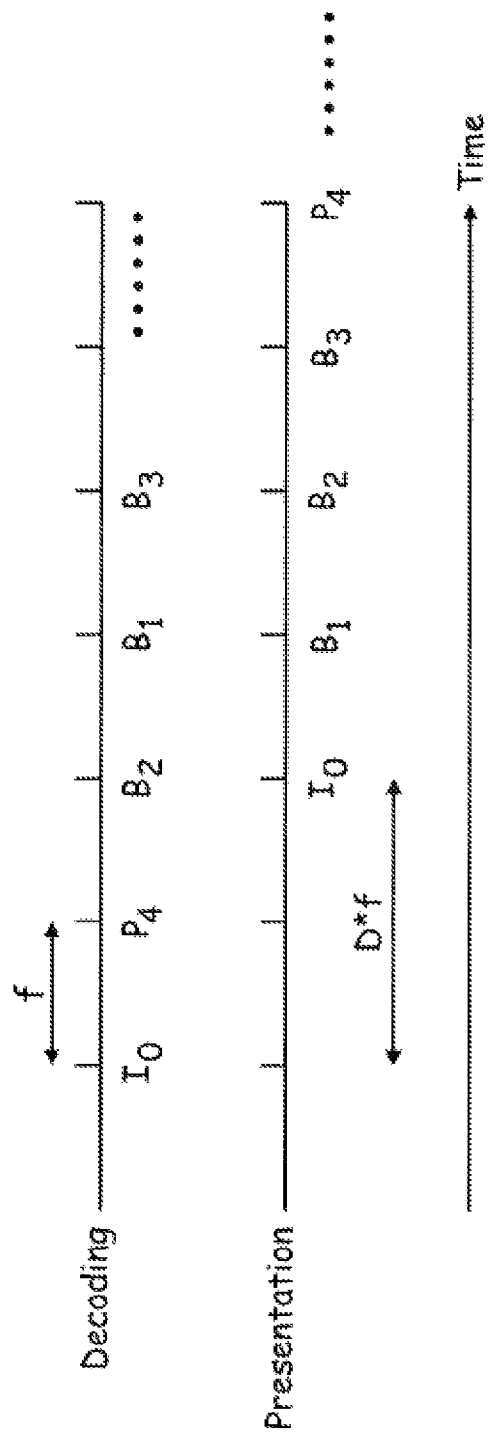
FIG. 1A is a timing diagram for displaying and presenting an exemplary video sequence.
Figure 1B:
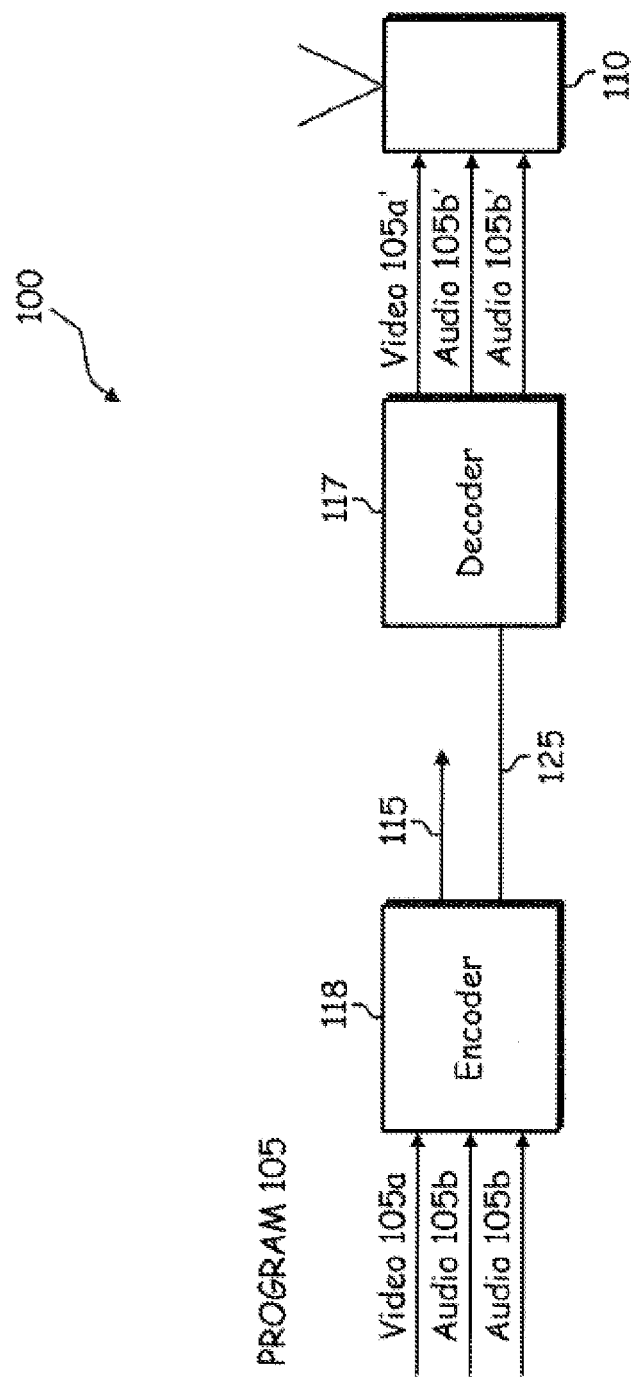
FIG. 1B is a block diagram of a video transport system wherein the present invention can be practiced.

Referring now to FIG. 1B, there is illustrated a block label system 100 in FIG. 1B diagram of an exemplary video transport system 100 for transporting a program 105 to a remote presentation device 110. The program 105 is transmitted over a communication channel 125. However, due to bandwidth limitations, the program 105 is compressed in accordance with the MPEG-4 AVC standard. The program 105 comprises video 105a and audio streams 105b. An encoder 118 receives the video 105a and audio streams 105b and compresses, packetizes, and multiplexes the video 105a and audio streams 105b. The compressed, packetized, and multiplexed video 105a and audio 105b streams, known as a bit stream 115 are then transmitted over the communication channel 125. The bit stream 115 is received by a decoder 117. The decoder 117 decompresses the bit stream 115, thereby resulting in video 105a' and audio 105b' streams. The video 105a' and audio streams 105b', ideally, are imperceptibly different from video 105a and audio streams 105b.

Figure 2A:
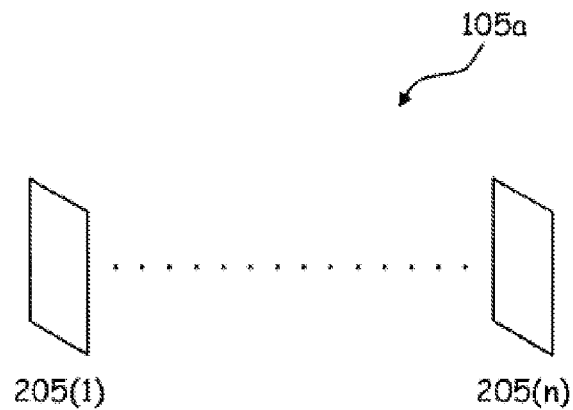
FIG. 2A is a block diagram of an exemplary video stream.

Referring now to FIG. 2A, there is illustrated an exemplary video stream 105a. A video stream 105a is a series label video stream 105a in FIG. 2A of instantaneous images associated with particular time intervals. Each image is associated with a frame 205(1) ... 205(n). A frame 205 is a two-dimensional grid of pixels, wherein each pixel in the grid corresponds to a particular spatial location of the image at the particular time interval. In some cases, the frames 205 can comprise two fields, wherein the fields are associated with adjacent time intervals.

Pursuant to MPEG-4 AVC, the frames 205(1) ... 205(n) are encoded using algorithms taking advantage of both spatial redundancy and/or temporal redundancy, thereby resulting in a video elementary system. The algorithms taking advantage of spatial redundancy utilize discrete 4×4 transformation, and quantization, to reduce the amount of data required to code each picture.

The algorithms taking advantage of temporal redundancy use motion compensation based prediction. With pictures 205 that are closely related, it is possible to accurately represent or "predict" the data of one picture based on the data of a reference picture 205, provided the translation is estimated. Pictures can be considered as snapshots in time of moving objects. Therefore, one picture 205 can be associated with a displacement of another picture 205.

Pursuant to the MPEG Standard, many pictures 205 are predicted from another reference picture(s) 205. A two-dimensional motion vector(s) represents the vertical and horizontal displacement between the picture 205 and the reference picture(s) 205. The difference between the picture 205 and the reference picture 205 is the prediction error. The prediction error can be encoded in the transform domain using a small number of bits for representation.

Figure 2B:
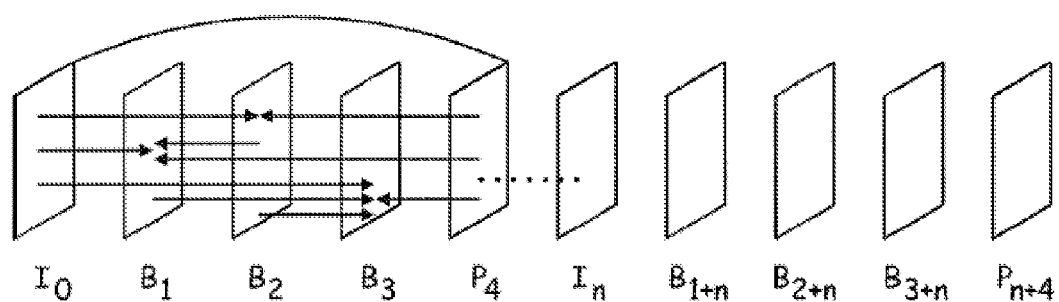
FIG. 2B is a block diagram of encoded frames.

Referring now to FIG. 2B, there is illustrated an exemplary block diagram of encoded frames, known as pictures $I_0$, $B_1$, $B_2$, $B_3$, $P_4$ ..., $I_n$, $B_{1+n}$, $B_{2+n}$, $B_{3+n}$, and $P_{4+n}$, representing the video stream in FIG. 2A. The data dependence of each picture is illustrated by the arrows. For example, picture $B_3$ is dependent on pictures $I_0$, $B_1$, $B_2$, and $P_4$. Pictures coded using temporal redundancy with respect to either exclusively earlier or later pictures of the video sequence are known as predicted pictures (or P-pictures), for example picture $P_4$. Pictures coded using temporal redundancy with respect to earlier and later pictures of the video sequence are known as bi-directional pictures (or B-pictures), for example, pictures $B_1$, $B_2$, $B_3$. Pictures which are not coded using temporal redundancy are known as I-pictures, for example $I_0$. Anchor pictures include both I and P-pictures. A video is typically coded using an anchor picture at regular intervals, e.g., $I_0$, $P_4$, such as once every four pictures. A parameter, m, is defined as the number of B-pictures, e.g., $B_1$, $B_2$, $B_3$, between the anchor pictures. In the illustration, m=3. Another parameter, known as the sequence delay parameter, represents the number of picture delays between the decoded sequence and the presented sequence, e.g. the number of picture delays between $I_0$ being decoded and $I_0$ being presented. The delay parameter is constrained by the buffer memory limitations in the encoder 118, specified by the number of short-term pictures and also number of reference pictures in MPEG-4 AVC. In order to predict a picture from a reference picture, the earlier picture, $I_0$ would require storage in a buffer during encoding of $P_4$.

Figure 2C:
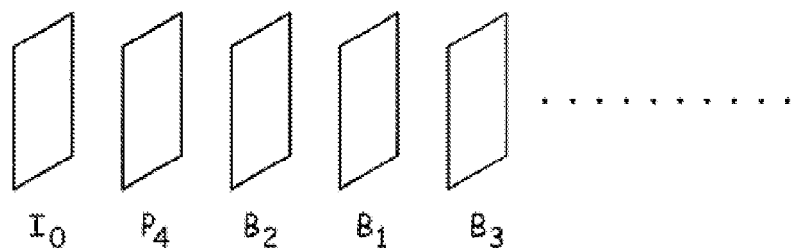
FIG. 2C is a block diagram of pictures in data dependent order.

The foregoing data dependency among the pictures requires decoding of certain pictures prior to others. Additionally, the use of later pictures as reference pictures for previous pictures, requires that the later picture is decoded prior to the previous picture. As a result, the pictures cannot be decoded in temporal order. Accordingly, the pictures are transmitted in data dependent order. Referring now to FIG. 2C, there is illustrated a block diagram of the pictures in data dependent order.

Figure 2D:
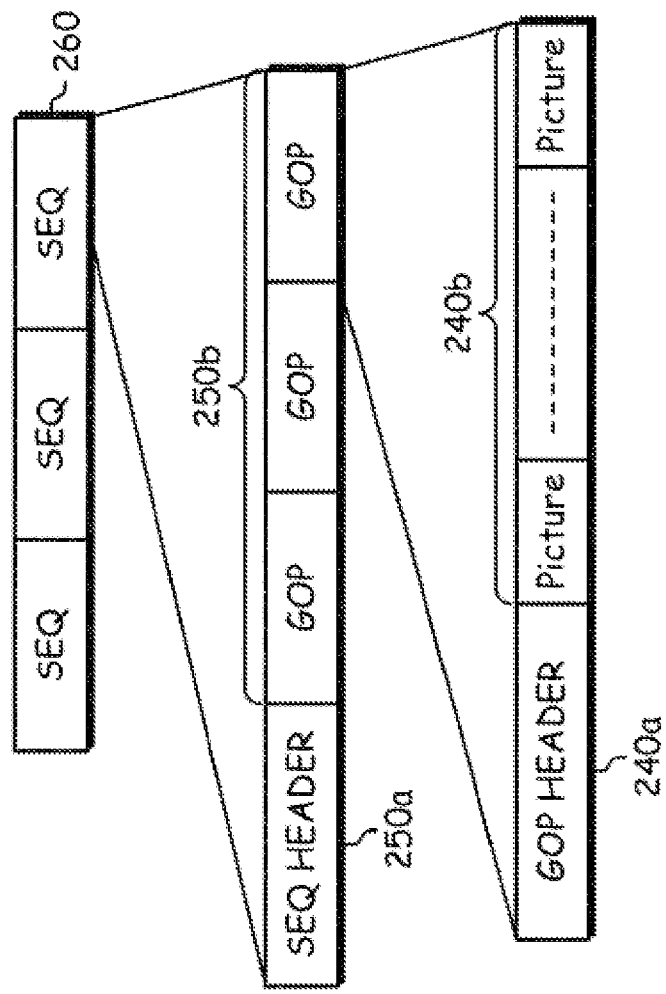
FIG. 2D is a block diagram of the MPEG hierarchy.

The pictures are further divided into groups known as groups of pictures (GOP). Referring now to FIG. 2D, there is illustrated a block diagram of the MPEG hierarchy. The pictures of a GOP are encoded together in a data structure comprising a picture parameter set, which indicates the beginning of a GOP, 240*a* and a GOP Payload 240*b*. The GOP Payload 240*b* stores each of the pictures in the GOP in data dependent order. GOPs are further grouped together to form a sequence. The GOPs of the sequence are encoded together in a data structure comprising a sequence parameter set 250*a* and a sequence payload 250*b*.

The MPEG encoder 118 determines the sequence delay parameter, D, based on encoding configuration and the delay parameter can be encoded into the sequence level parameter set or Supplemental Enhancement Information (SEI) for the sequence 250*a*, as a variable length code, for example. The sequence delay parameter indicates the maximum reordering delay. In MPEG-4 AVC, both field and frame pictures are allowed and field pictures do not need to be transmitted in pairs. The unit of the delay parameter can be selected as a field. A frame picture is considered as a two-field unit. The sequence delay parameter can be a number of field-picture units. In order to make changes to the sequence delay parameter, D, the coded video sequence can be terminated by a sequence end code.

The video stream 105*a* is represented by any number of sequences 250. The encoded sequences 250 together form the video elementary stream 260. The MPEG encoder 118 packetizes the video elementary stream 260, thereby forming a packetized elementary stream which includes a series of data packets. Each data packet is associated with a particular picture.

Figure 3:
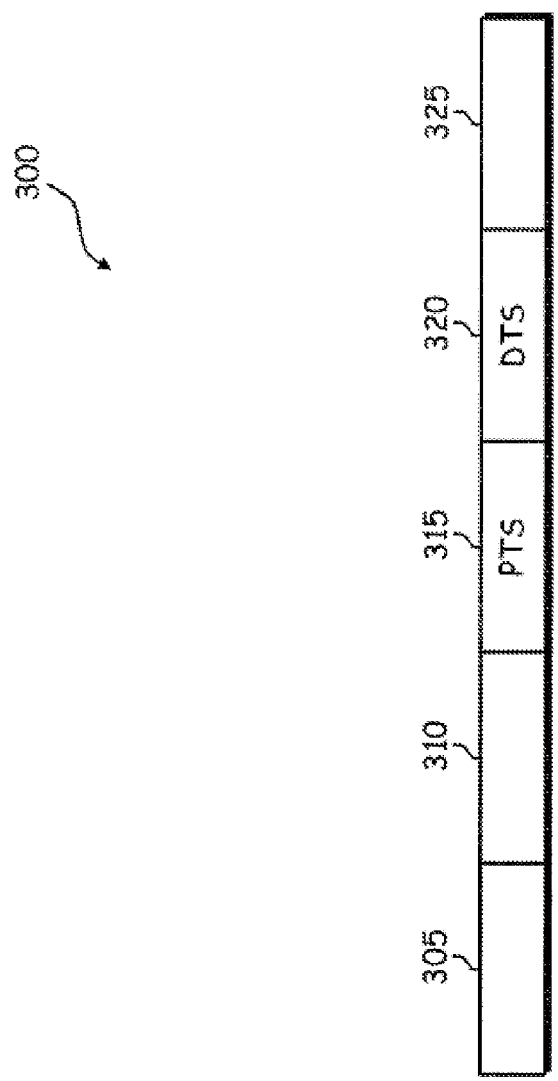
FIG. 3 is a block diagram of an exemplary video elementary stream packet.

Referring now to FIG. 3, there is illustrated a block diagram describing an exemplary video elementary stream packet 300. The video elementary stream packet 300 includes a packet label video elementary stream packet 300 in FIG. 3 header 305, a basic extension 310, an optional PTS field 315, an optional DTS field 320, and a payload 325. The header 305 comprises five bytes, followed by the basic extension 310 which comprises three bytes. The basic extension 310 includes a PTS flag 310*a*, and a DTS flag 310*b*. Wherein the PTS flag 310*a* is set, the PTS field 315 comprising five bytes is appended to the basic extension. In the case where the DTS flag 310*b* is set, the DTS field 315 comprising five bytes is appended to the basic extension. The combination of the DTS flag 310*b* set only is not permitted. The PTS field 315 stores a 33-bit PTS, while the DTS field 320 stores a 33-bit DTS.

The MPEG encoder 118 determines the PTS and DTS and inserts the PTS and DTS into PTS field 315 and DTS field 320, respectively. The DTS is calculated by adding a fixed delay, $T_d$, to the time at which the picture associated with the video elementary stream packet is buffered at the MPEG encoder 118. $T_d$ is nominally the end-to-end delay, and is determined during system integration testing.

The MPEG encoder 118 determines the PTS from the DTS by adding an offset to the DTS. The offset is measured in units, f, representing one field period (a frame structure picture is considered as 2f). The offset is a function of the sequence delay parameter, D, the picture type, and the number of pictures between anchor pictures, m.

Figure 4:
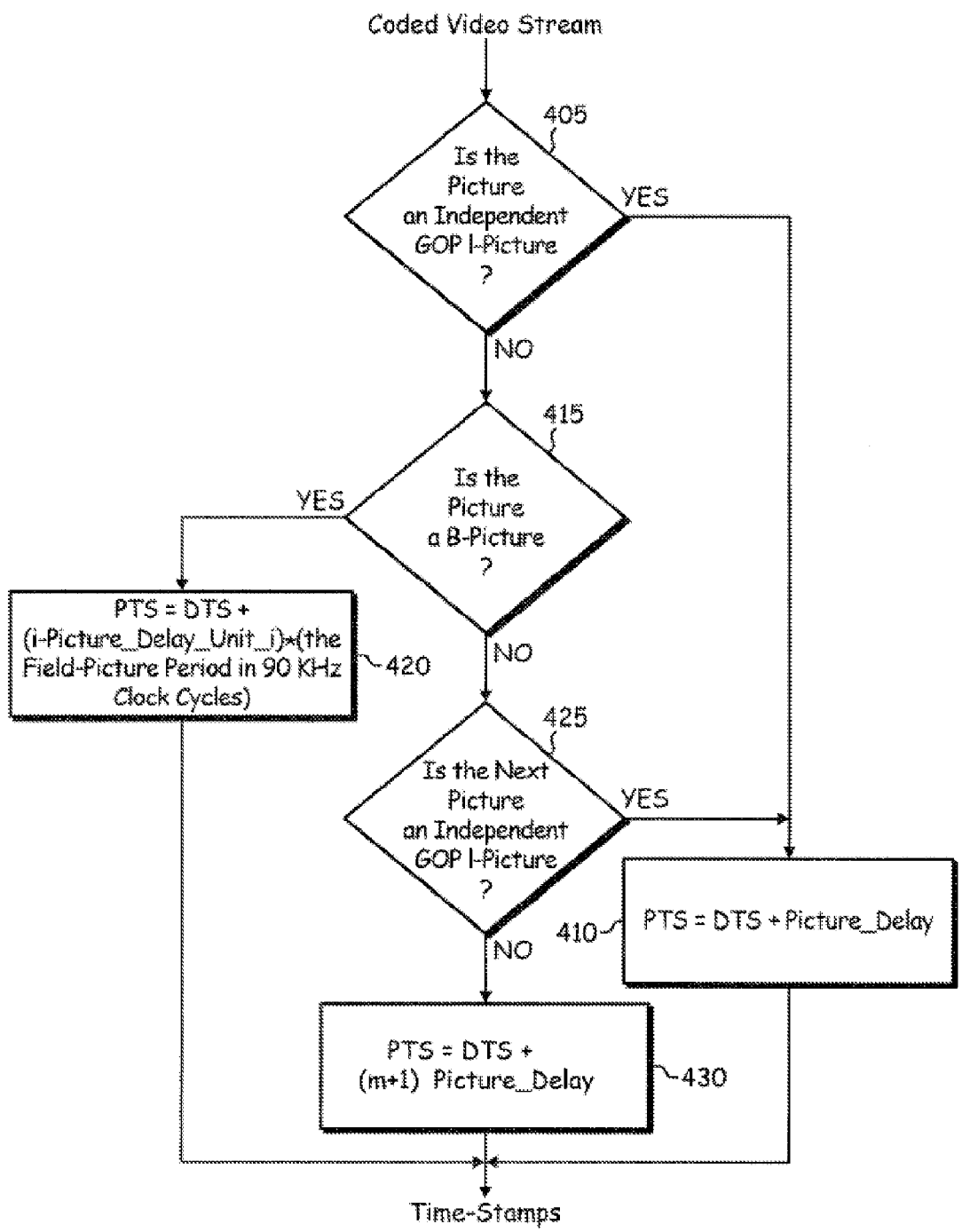
FIG. 4 is a flow diagram describing the calculation of the presentation time stamp in accordance with an embodiment of the invention.

Referring now to FIG. 4, there is illustrated a flow diagram describing the calculation of PTS for a particular picture in accordance with an embodiment of the present invention. At 405, a determination is made whether the picture is an I picture from an independent group of pictures (an independent GOP I-picture). The encoder 118 may generate two types of I-pictures, an I-picture that follows a non-independent group of pictures, or an I-picture that follows an independent group of pictures. A non-independent group of pictures I-picture will begin a group of pictures to which motion vectors in a previous group of pictures point.

Figure 5A:
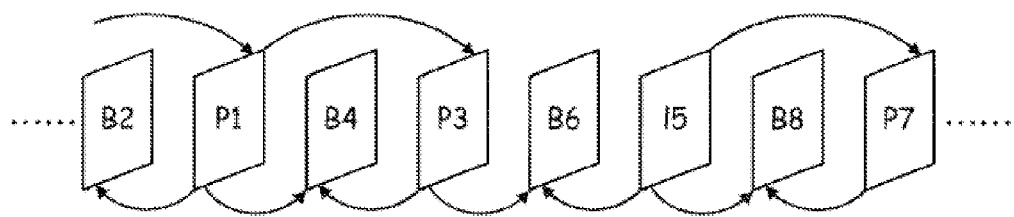
FIG. 5A is a block diagram of a non-independent group of pictures.
Figure 5B:
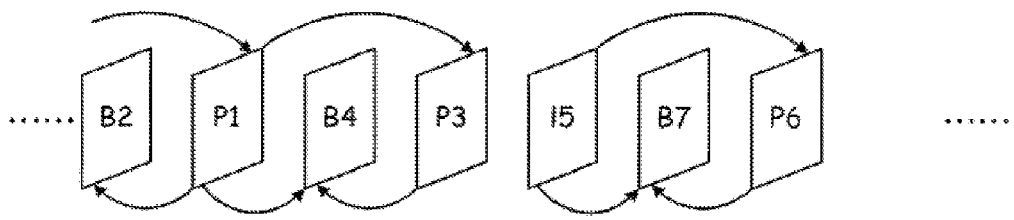
FIG. 5B is a block diagram of an independent group of pictures.

Referring now to FIG. 5A, there is illustrated a non-independent group of pictures stream in decode order. The B-picture, B6 has motion vectors that point to I5. I5 is therefore a non-independent I-picture. Referring now to FIG. 5B, there is illustrated an independent group of pictures stream in decode order. The motion vectors from the pictures P1, B2, P3, and B4 do not point to I5. Therefore, I5 is an independent I-picture.

Referring again to FIG. 4, if during 405, the picture is an independent GOP I-picture, the offset is equal to the sequence delay, D*f, and PTS=DTS+D*f (410). If during 405, the picture is not an independent GOP I-picture, a determination (415) is made whether the picture is a B-picture. If during 415, the picture is a B-picture, the offset is (J+D−i)*f, and PST=DTS+(J+D−i)*f, where i is the field index for the picture measured in fields, and j is the presentation order index measured in fields (420). If during 415, the picture is not a B-picture, a determination is made whether the next picture is an independent GOP I-picture (425). If the next picture is an independent GOP I-picture during 425, then the offset is equal to the sequence delay, D*f, and PTS=DTS+D*f (410). If during 425, the next picture is not an independent GOP I-picture, then at 430, the offset is (m+1)*f, and PTS=DTS+(m+1)*f.

The packetized video elementary stream 300 is transmitted as part of a bit stream 115. In the bit stream 115, the video elementary stream packets 300 are transmitted in the data dependence order of the pictures associated therewith. The video elementary stream packets 300 include the DTS and PTS. The bit stream 115 is received by the MPEG decoder 116. The MPEG decoder 116 extracts the DTS and PTS, and uses the DTS and PTS to decode and present the pictures.

Figure 6:
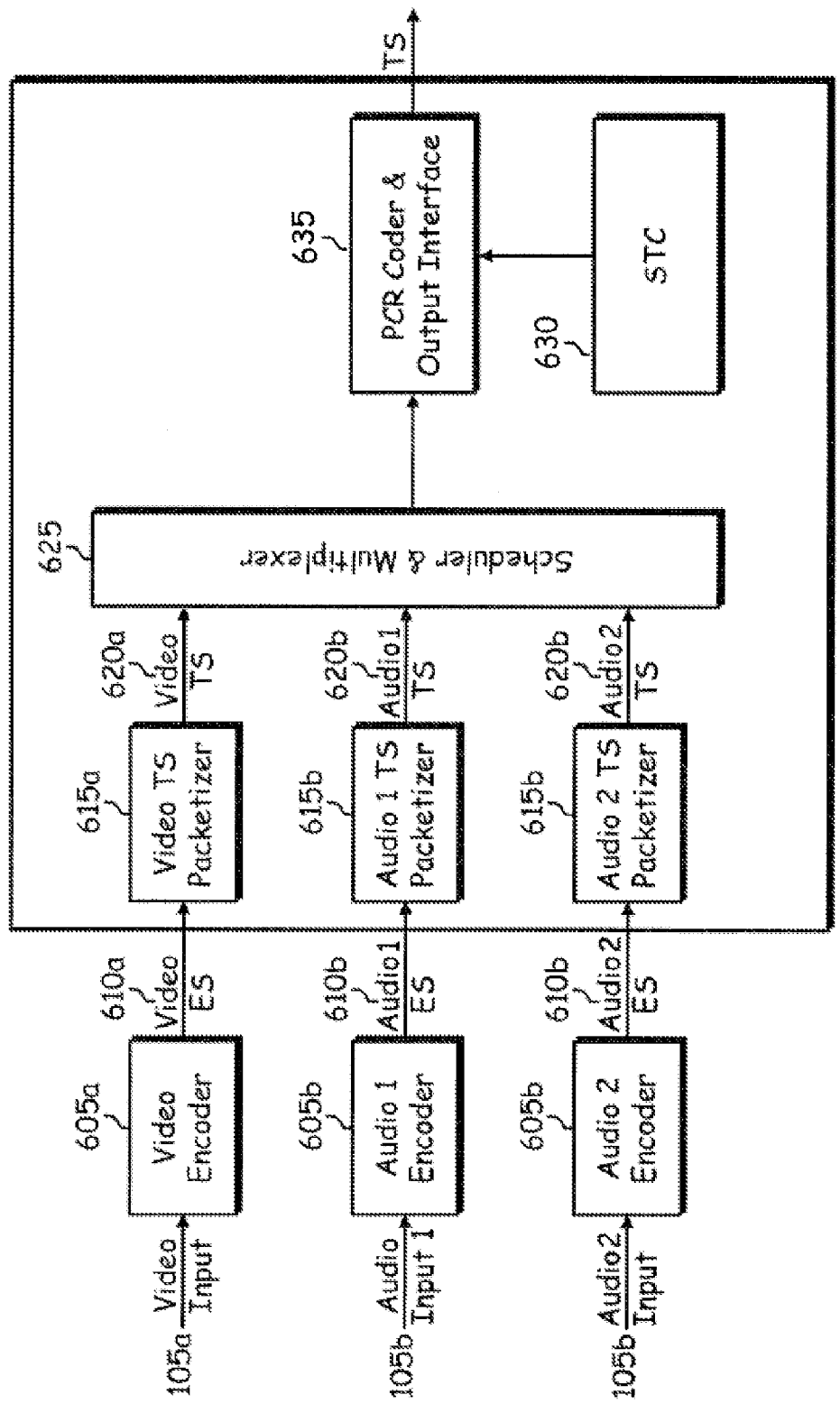
FIG. 6 is a block diagram of an encoder in accordance with an embodiment of the present invention.

Referring now to FIG. 6, there is illustrated a block diagram of an exemplary encoder 118 in accordance with an embodiment of the present invention. The encoder 118 receives the video 105*a* and audio 105*b* at video encoder 605*a*, and audio encoders 605*b*. The video encoder 605*a* encodes the video in accordance with the MPEG-4 AVC standard, and outputs a video elementary stream 610*a*. The audio encoders 605*b* encode the audio streams 105*b* and output audio elementary streams 610*b*.

The video elementary stream 260 is received by a video transport stream packetizer 615*a*. The video transport stream packetizer 615*a* transforms the video elementary stream 610*a* into a packetized video elementary stream 300. The video transport stream packetizer 615*a* also places a PTS and DTS in the PTS field 315, and DTS field 320, respectively. Additionally, the video transport stream packetizer 615*a* adds a transport packet header, thereby resulting in transport packets 620*a*. Similarly, the audio elementary streams 610*b* are received by an audio stream packetizer 615*b*. The audio transport stream packetizer 615*b* transforms the audio elementary stream 610*b* into a series of transport packets 620*b*.

A scheduler and multiplexer 625 receives and multiplexes the transport packets 620*a* and 620*b*. Additionally, a system time clock 630 is locked to a program clock reference 635.

The program clock reference 635 latches a 33-bit value of a 100 Khz to the MPEG-4 transport packets 620.

Figure 7:
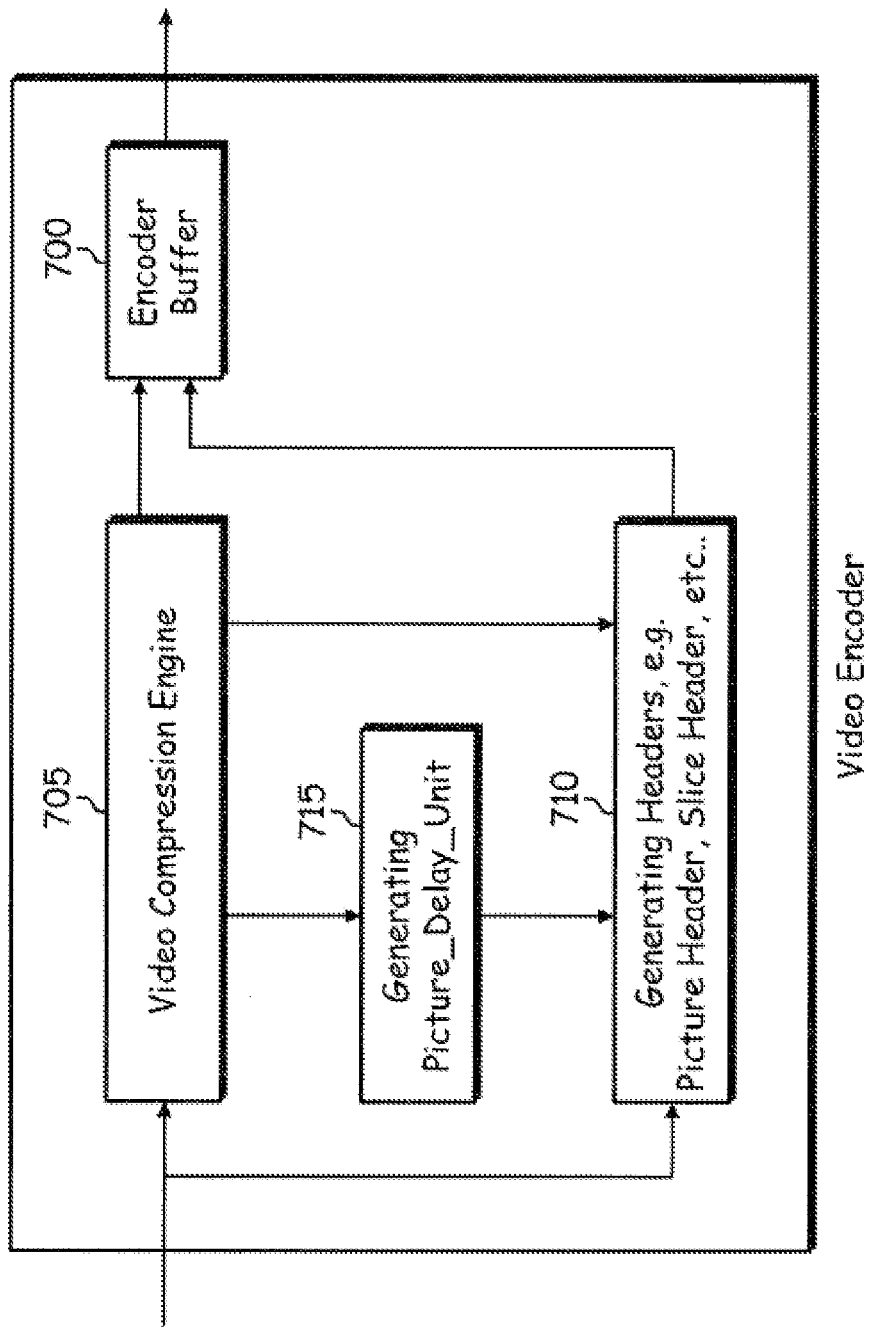
FIG. 7 is a block diagram of a video encoder in accordance with an embodiment of the present invention.

Referring now to FIG. 7, there is illustrated a block diagram of a video encoder 605a in accordance with an embodiment of the present invention. The video encoder 605a includes a video compression engine 705 that receives the video 105a and compresses the video 105a. The compressed video stream 105a output from the video compression engine forms the data portion of the video elementary stream 260. A packet header generator 710 generates MPEG packet headers for the video elementary stream 260 pursuant to the MPEG-4 AVC standard. The header and data portions are combined by an encoder buffer 700.

Additionally, the video encoder 605a includes a delay parameter generator 715 for generating the sequence delay unit. The delay parameter generator 715 monitors the video compression engine 705 and provides the sequence delay to the packet header generator 710. The packet header generator 710 places the sequence delay parameter in a sequence header 250a. The delay parameter can be encoded using a variable length code.

Figure 8:
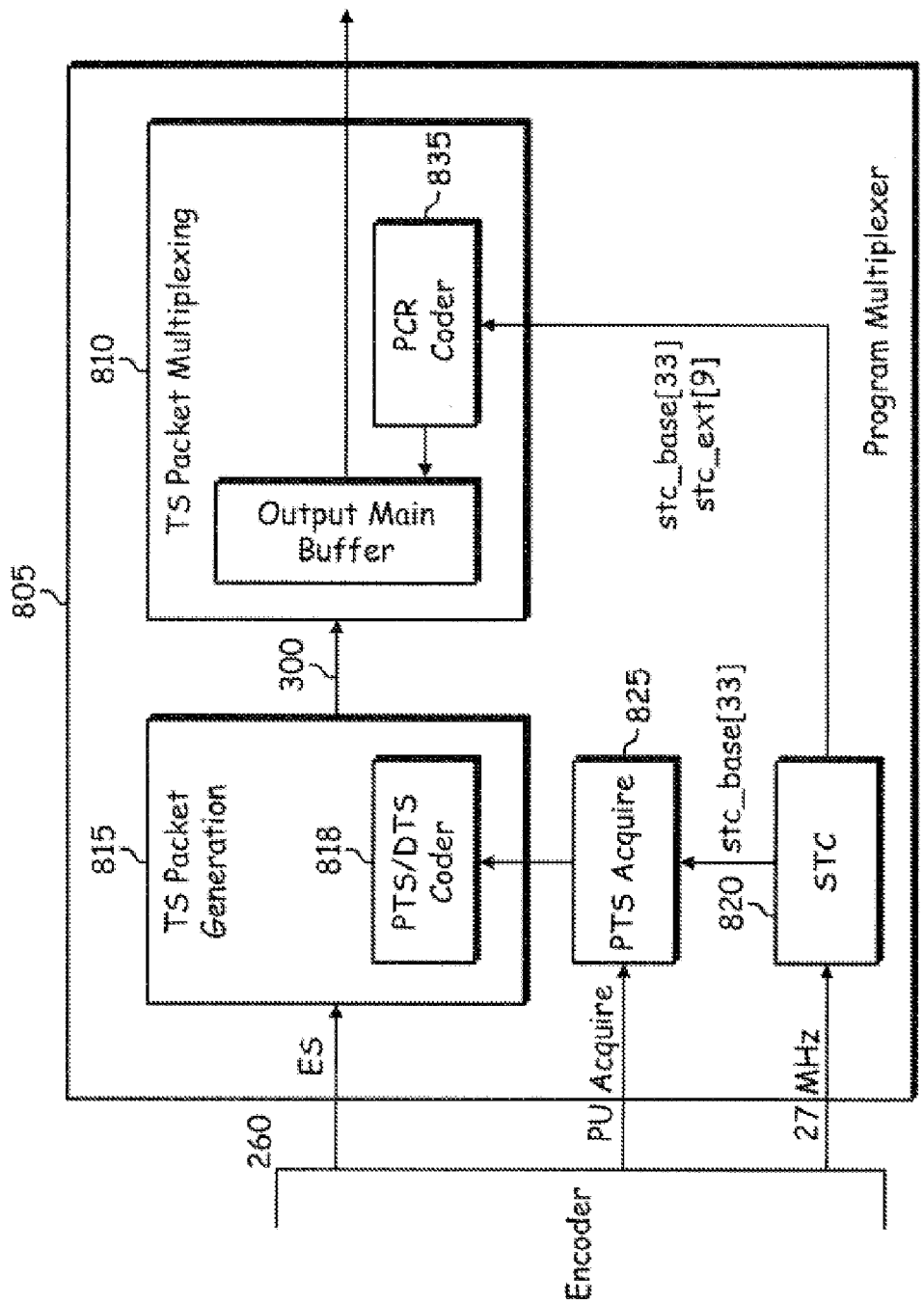
FIG. 8 is a block diagram of a program multiplexer in accordance with an embodiment of the present invention.

Referring now to FIG. 8, there is illustrated a block diagram of a program multiplexer 805 in accordance with an embodiment of the present invention. The program multiplexer 805 includes a transport stream packet multiplexing unit 810, an elementary stream packet generation unit 815, a system time clock 820, and a PTS acquire unit 825.

The elementary stream packet generating unit 815 receives the video elementary stream 260 and packetizes the video elementary stream 260, thereby resulting in packetized video elementary stream 300. During the packetization of the video elementary stream 260, the elementary stream packet generating unit 815 also stamps each picture with a PTS and DTS. The PTS and DTS are provided by a PTS/DTS coder 818.

When a picture arrives at encoder buffer 700, a picture unit acquire signal (PU acquire) is transmitted by the video encoder 605a to the PTS acquire unit 825. Responsive to receiving PU acquire from the video encoder 605a, the PTS acquire 825 samples the system time clock 820. The system time clock 820 is a master clock of the video 605a and audio encoders 605b for the program. The system time clock 820 receives a 27 MHz signal which is divided by 300 to produce a 90 KHz clock signal. The time is kept by a 33 bit counter which is incremented by the 90 KHz signal. The PTS acquire unit 825 then transmits the system time clock 820 value to the PTS/DTS coder 818. The PTS/DTS coder 818 determines the DTS by adding a constant, $T_d$, to the system time clock 820 value. $T_d$ is nominally the end-to-end delay and can be determined during system integration testing.

The PTS/DTS coder 818 determines the PTS from the DTS as described in FIG. 4. The PTS is a function of the sequence delay, D, the picture type, and the number of pictures between anchor pictures, m.

The video elementary stream packet generation unit 815 transmits the packetized video elementary stream 300 containing the DTS 315 and PTS 320 to the transport stream packet multiplexing unit 810. The transport stream packet multiplexing unit 810 adds a PCR time stamp from PCR coder 835.

The MPEG encoder 118 as described herein may be implemented as a board level product, as a single chip, application specific integrated circuit (ASIC), or with varying levels of the MPEG encoder 118 integrated on a single chip with other portions of the system as separate components. The degree of integration of the MPEG encoder 118 will primarily be determined by the speed of the incoming video and audio streams, and cost considerations. Because of the sophisticated nature of modern processors, it is possible to utilize a commercially available processor, which may be implemented external to an ASIC implementation of the present system.

Figure 9:
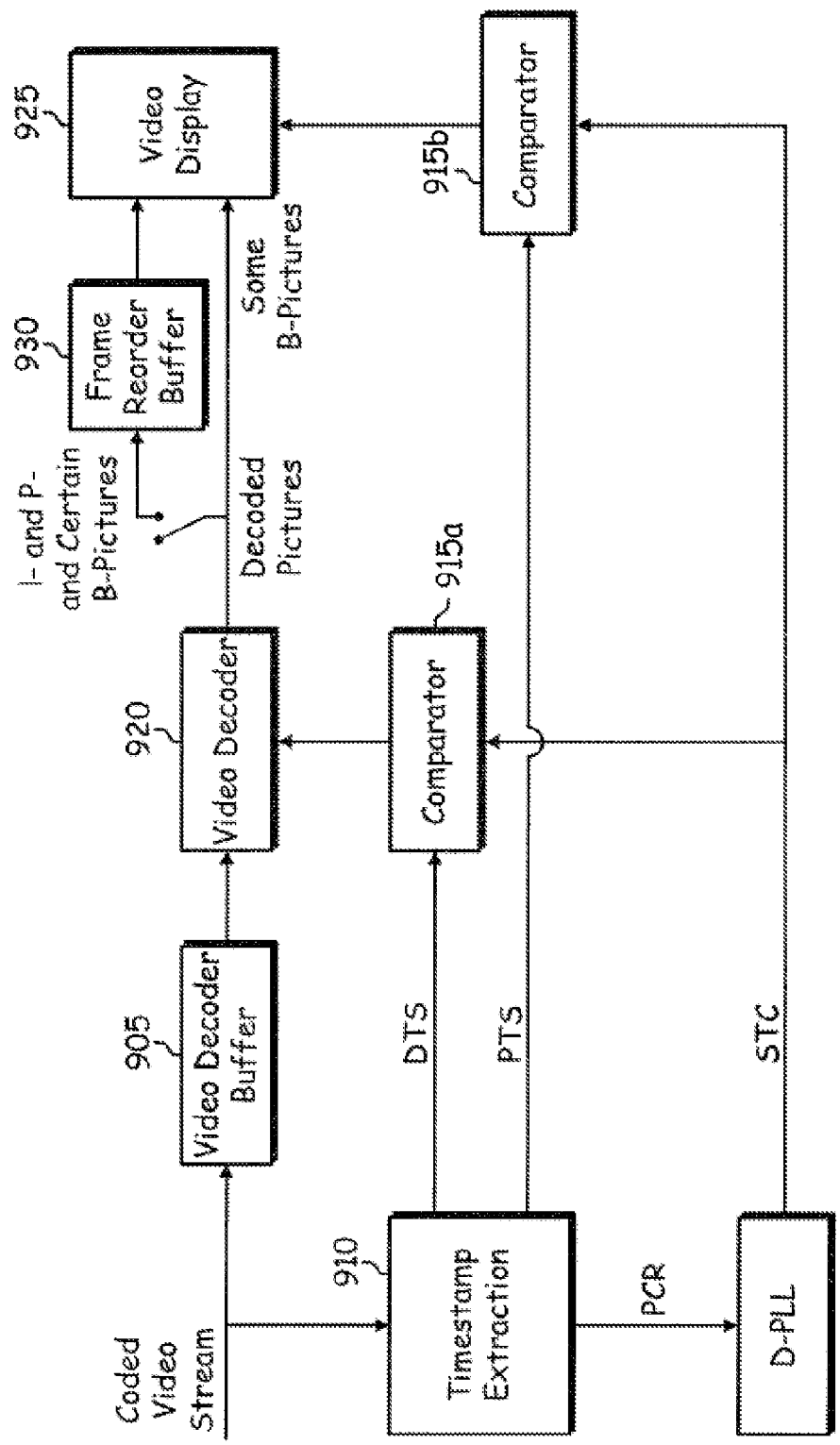
FIG. 9 is a block diagram of a decoder in accordance with an embodiment of the present invention.

Referring now to FIG. 9, there is illustrated a block diagram of an exemplary MPEG decoder 117 in accordance with an embodiment of the present invention. The MPEG decoder 117 receives the bitstream 115, and demultiplexes the bitstream 115 into the constituent packetized video elementary stream 260 and packetized audio elementary streams 620b. The packetized video elementary stream 260 is received at a video decoder buffer 905 and at a time stamp extraction unit 910. The timestamp extraction unit 910 extracts DTS, PTS, and the PCR from each of the pictures in the packetized video elementary stream 260. The DTS and PTS are both transmitted to comparators 915a, 915b. Each of the comparators 915 compare the respective DTS or PTS to the system time clock, STC. When the system time clock STC equals DTS, the picture associated with the DTS is to be decoded by a video decoder 920. When the system time clock, STC equals PTS, the picture associated with the PTS is to be presented on video display 925. The video decoder buffer 905 is used to store pictures which are received prior to DTS. A frame reorder buffer 930 is used to store pictures between DTS and PTS.

Figure 10:
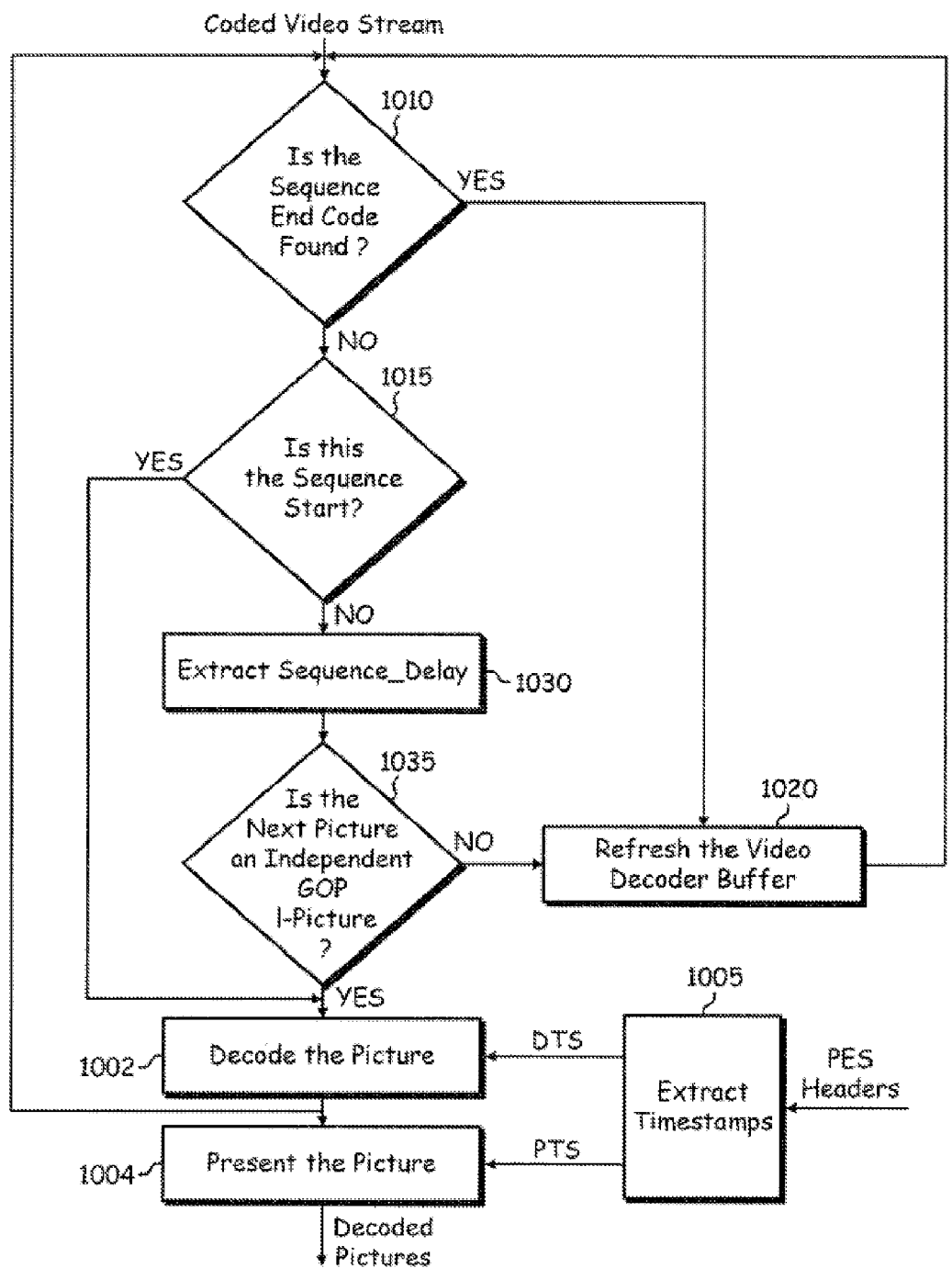
FIG. 10 is a flow diagram describing the operation of an MPEG decoder in accordance with an embodiment of the invention.

Referring now to FIG. 10, there is illustrated a flow diagram describing the operation of the decoder, in accordance with an embodiment of the present invention. The transport packets representing video are received. The headers, including the DTS 320 and PTS 315 are extracted and provided to the time stamp extraction unit 1005. The time stamp extraction unit 1005 controls the decoding 1002 and presentation 1004 of the pictures.

The video elementary stream is examined for a sequence end code at 1010 and a sequence start code 1015. If a sequence end code is found, the video decoder buffer 905 is refreshed (1020). If the sequence start code is found during 1015, the pictures are provided to the decoder 920 (1002). If neither a sequence start code nor a sequence end code is found during 1010 and 1015, the delay parameter is extracted (1030) and a determination is made whether the next picture is an independent GOP I-picture (1035). If the next picture is not an independent GOP I-picture, the video decoder buffer 905 is refreshed (1020). If the next picture is an independent GOP I-picture, the picture is decoded (1002) by decoder 920.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

For example, the sequence delay parameter can be generalized to the picture delay parameter for each picture to indicate the picture delay in clock ticks between the decoding the picture and the presenting the picture. The picture delay parameter can be encoded into the picture parameter set or SEI for the picture. The PTS can be derived from DTS based on the corresponding picture delay parameter. This can be used in the video sequence with variable time interval between pictures.

The invention claimed is:

1. A method, comprising:
   encoding a plurality of frames, wherein at least one of the plurality of encoded frames is predicted from another one of the plurality of encoded frames, with an encoder;

encoding a delay parameter in a sequence header of a hierarchical bitstream including the plurality of encoded frames, the hierarchical bitstream comprising the sequence header and a sequence payload, the sequence payload comprising a Group of Pictures Header and a plurality of Groups of Pictures, wherein each Group of Pictures further comprise a plurality of pictures and picture headers, wherein the delay parameter is a programmable re-ordering buffer delay determined based upon an encoding configuration of the encoder;

encoding a presentation time stamp with each of the plurality of encoded frames, wherein the presentation time stamp is a function of the delay parameter, a decode time stamp, and a number of frames between a first anchor frame of the plurality of frames and a second anchor frame of the plurality of frames; and transmitting the hierarchical bitstream over a communication medium.

2. The method of claim 1, further comprising encoding a decoding time stamp with each of said plurality of encoded frames.

3. The method of claim 1, wherein the delay parameter is encoded with a variable length code.

4. The method of claim 1, wherein the hierarchical bitstream comprises a variable time interval between pictures.

5. The method of claim 1, wherein the plurality of pictures in each Group of Pictures is in data dependent order.

6. The method of claim 1, further comprising packetizing the hierarchical bitstream into payloads of a plurality of transport packets for transmission over the communication medium.

7. The method of claim 6, further comprising adding a program clock reference (PCR) time stamp to the plurality of transport packets for transmission over the communication medium.

8. An encoder, comprising:
a video compression engine for encoding a plurality of frames, wherein at least one of the plurality of encoded frames is predicted from another one of the plurality of encoded frames;
a header generator for encoding a delay parameter in a sequence header of a hierarchical bitstream including the plurality of encoded frames, the hierarchical bitstream comprising the sequence header and a sequence payload, the sequence payload comprising a Group of Pictures Header and a plurality of Groups of Pictures, wherein each Group of Pictures further comprise a plurality of pictures and picture headers, wherein the delay parameter is a programmable re-ordering buffer delay determined based upon an encoding configuration of the encoder; and
a packetizer for encoding a presentation time stamp with each of the plurality of encoded frames, wherein the presentation time stamp is a function of the delay parameter, a decode time stamp, and a number of frames between a first anchor frame of the plurality of frames and a second anchor frame of the plurality of frames.

9. The encoder of claim 8, further comprising an output interface for transmitting the hierarchical bitstream over a communication medium.

10. The encoder of claim 8, wherein the packetizer is further configured for encoding a decode time stamp with each of the plurality of encoded frames.

11. The encoder of claim 8, wherein the presentation time stamp is a function of a picture type corresponding to the frame encoded with the presentation time stamp.

12. The encoder of claim 8, wherein the plurality of pictures in each Group of Pictures is in data dependent order.

13. The encoder of claim 8, wherein the first anchor frame and the second anchor frame comprise an I-picture and a P-picture.

14. The encoder of claim 13, wherein the I-picture is an independent I-picture.

15. A method, comprising:
receiving, by a decoder, a hierarchical bitstream comprising a sequence header and a sequence payload, the sequence header comprising a delay parameter, the sequence payload comprising a Group of Pictures Header and a plurality of Groups of Pictures, wherein each Group of Pictures further comprise a plurality of encoded pictures and picture headers, the hierarchical bitstream including encoded frames having a presentation time stamp that is a function of the delay parameter, a decode time stamp, and a number of frames between a first anchor frame of a plurality of frames and a second anchor frame of a plurality of frames, wherein the delay parameter is a programmable re-ordering buffer delay determined based upon an encoding configuration of an encoder that encoded the Groups of Pictures;
determining whether a sequence end code or a sequence start code is present in the hierarchical bitstream;
in response to the determination, obtaining the delay parameter from the sequence header and determining a picture type for a next encoded picture of one of the plurality of Groups of Pictures; and
in response to the picture type of the next encoded picture being an independent I-picture, decoding the next encoded picture.

16. The method of claim 15, further comprising refreshing a decoder buffer in response to a determination that a sequence end code is present.

17. The method of claim 15, further comprising refreshing a decoder buffer in response to a determination that the next encoded picture is not an independent I-picture.

18. The method of claim 15, further comprising, in response to a determination that a sequence start code is present, decoding the next encoded picture without obtaining the delay parameter.

19. The method of claim 15, wherein the plurality of pictures in each Group of Pictures is in data dependent order.

20. The method of claim 15, wherein the hierarchical bitstream comprises a variable time interval between pictures.

* * * * *